(12) United States Patent
Cleron et al.

(10) Patent No.: US 7,076,534 B1
(45) Date of Patent: Jul. 11, 2006

(54) SERVER-SIDE SCRIPTING THAT ENABLES CREATION OF CUSTOMIZED DOCUMENTS FOR CLIENTS

(75) Inventors: Michael A. Cleron, Menlo Park, CA (US); Erik Fortune, Los Altos, CA (US); Lennart Lövstrand, San Francisco, CA (US); Steve R. Sandke, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 863 days.

(21) Appl. No.: 09/607,839

(22) Filed: Jun. 30, 2000

(51) Int. Cl.
*G06F 15/16* (2006.01)
*G06F 15/00* (2006.01)

(52) U.S. Cl. ..................... 709/219; 715/513
(58) Field of Classification Search ................ 709/219, 709/246, 203, 217; 715/500–542
See application file for complete search history.

(56) References Cited

U.S. PATENT DOCUMENTS

| | | | | |
|---|---|---|---|---|
| 5,740,430 A | * | 4/1998 | Rosenberg et al. | 707/200 |
| 5,761,662 A | * | 6/1998 | Dasan | 707/10 |
| 5,809,478 A | * | 9/1998 | Greco et al. | 705/4 |
| 5,859,972 A | * | 1/1999 | Subramaniam et al. | 709/203 |
| 5,928,323 A | * | 7/1999 | Gosling et al. | 709/203 |
| 5,933,811 A | * | 8/1999 | Angles et al. | 705/14 |
| 5,944,790 A | * | 8/1999 | Levy | 709/218 |
| 6,012,083 A | * | 1/2000 | Savitzky et al. | 709/202 |
| 6,026,431 A | * | 2/2000 | Hinrichs et al. | 709/203 |
| 6,029,182 A | * | 2/2000 | Nehab et al. | 715/523 |
| 6,061,698 A | * | 5/2000 | Chadha et al. | 707/513 |
| 6,076,108 A | * | 6/2000 | Courts et al. | 709/227 |
| 6,081,837 A | * | 6/2000 | Stedman et al. | 709/219 |
| 6,131,116 A | * | 10/2000 | Riggins et al. | 709/219 |
| 6,327,608 B1 | * | 12/2001 | Dillingham | 709/203 |
| 6,332,127 B1 | * | 12/2001 | Bandera et al. | 705/14 |
| 6,356,863 B1 | * | 3/2002 | Sayle | 703/27 |
| 6,377,993 B1 | * | 4/2002 | Brandt et al. | 709/227 |
| 6,430,545 B1 | * | 8/2002 | Honarvar et al. | 706/47 |
| 6,438,539 B1 | * | 8/2002 | Korolev et al. | 707/3 |
| 6,519,617 B1 | * | 2/2003 | Wanderski et al. | 715/513 |
| 6,560,639 B1 | * | 5/2003 | Dan et al. | 709/218 |
| 6,578,192 B1 | * | 6/2003 | Boehme et al. | 717/115 |

(Continued)

OTHER PUBLICATIONS

Lerdorf, PHP Pocket Reference, Jan. 2000, Sections 1.3.1 and 1.9.1.*

(Continued)

*Primary Examiner*—David Wiley
*Assistant Examiner*—J. Bret Dennison
(74) *Attorney, Agent, or Firm*—Workman Nydegger

(57) ABSTRACT

Server-side scripting for creating customized documents for clients is disclosed. A server application processes code included in a script, causing the server application to issue a request to a decision engine to select content that is designated as appropriate for a client based on attributes of the client. The request is issued to the decision engine without the server application indicating the decision criteria that are to be used or the particular attributes of the client on which the selection is to be based. The decision engine uses the appropriate decision criteria and selects content for the document from content files associated with the decision engine. The decision engine can instead select further portions of script from the content files, which are processed by the server application and result in additional decisions being made by the decision engine. In this manner, the customization process can be made as complex as necessary without significantly increasing the complexity of the scripts executed by the server application. The selection complexity is shifted to the decision engine, and changes to the selection logic can be made there rather than at the scripts.

23 Claims, 4 Drawing Sheets

U.S. PATENT DOCUMENTS

| | | | |
|---|---|---|---|
| 6,581,096 B1* | 6/2003 | Cottrille et al. | 709/223 |
| 6,594,697 B1* | 7/2003 | Praitis et al. | 709/225 |
| 6,662,343 B1* | 12/2003 | Gebauer | 715/517 |
| 6,678,681 B1* | 1/2004 | Brin | 707/6 |
| 6,678,738 B1* | 1/2004 | Haverstock et al. | 709/246 |
| 6,704,776 B1* | 3/2004 | Fortune | 709/219 |
| 6,715,129 B1* | 3/2004 | Hind et al. | 715/513 |
| 2002/0049833 A1* | 4/2002 | Kikinis | 709/219 |

OTHER PUBLICATIONS

Stefano Ceri, et al., "Data-Driven One-to-One Web Site Generation for Data-Intensive Applications," *Proceedings of the 25th VLDB Conference*, 1999, pp. 615-626.

Robert A. Barta, et al., "JESSICA: an object-oriented hypermedia publishing processor," *Computer Networks and ISDN Systems 30*, 1998, pp. 281-290.

Anders Kristensen, "Template resolution in XML/HTML," *Computer Networks and ISDN Systems 30*, 1998, pp. 239-249.

L. Ardissono, et al., "An Agent Architecture for Personalized Web Stores," *Autonomous Agents*, 1999, pp. 182-189.

Patrick van Amstel, et al., "An interchange format for cross-media personalized publishing," *Computer Networks 33*, 2000, pp. 179-195.

* cited by examiner

SERVER-SIDE SCRIPTING THAT ENABLES CREATION OF CUSTOMIZED DOCUMENTS FOR CLIENTS

BACKGROUND OF THE INVENTION

1. The Field of the Invention

The present invention relates to customization of documents for particular clients based on attributes of the clients. More specifically, the present invention relates to server-side scripting in which the decision process regarding how customized content is selected is removed from a server application and is implemented by a decision engine.

2. The Prior State of the Art

As the Internet becomes more accessible and as more information is provided to users on the Internet, the need for customizing information for particular uses has become more critical. Users can retrieve substantially any type of educational, news, entertainment, and general reference information from the Internet, and particularly from the World Wide Web. There is often a need for customizing information for particular users based on any number of criteria, including language, country, client computer hardware, software, and display device properties, level of subscription that the user may have subscribed to, and user profiles, such as age, interest, etc.

Customization of information for users can be performed by Web servers associated with individual Web sites including, for example, Internet portals, search engines, news services, financial sites, and the like. Customization of information can also be performed by servers associated with subscription based information services. Examples of such subscription based information services include value-added "members only" access to information by Internet service providers and intranets. In any of the foregoing examples, customization of information is performed by a server in response to a request by a client for a Web page or another document.

Extensible Style Language (XSL), which is a standard developed by the World Wide Web Consortium (W3C) and Active Server Pages (ASP), which is a standard developed by Microsoft Corporation of Redmond Wash., are two examples of server-side scripting systems whereby customized Web pages can be created at servers for particular clients. In either case, conventional customization is performed by a server application and an associated script selecting appropriate content for a user based on some criteria, such as language of the user. In general, at least three factors are involved in the process of selecting customized content for particular users: (1) attributes or properties specifically associated with the particular user, (2) the range of different versions of the content that are available, and (3) the decision parameters or criteria that select particular content based on the attributes or properties of the users and the range of available content.

Existing customization systems, such as those using ASP or XSL, enable the server application, with knowledge of the decision criteria and client attributes or properties (i.e., the first and third factors), to select from among various versions of content (i.e., the second factor). In XSL and ASP, the various versions of content exist separately from the server application in, for example; a database. The decision criteria and the instructions for obtaining the attributes or properties associated with the client are encoded directly into the source code or scripts of the server applications. Abstracting the content from the server application in this matter allows the content to be altered without requiring the source code or script to be modified. For example, if the customization process involves selecting an Internet page based on the user's language and country, the script may include a series of "if/then" clauses whereby appropriate content is selected based on the value of the language and country properties associated with the client.

In a specific example, a content database associated with the server could include four content files designated as en-US (English in the United States), en-CA (English in Canada), fr-CA (French in Canada), and fr-FR (French in France). The "if/then" clauses in the source code or script of the server application represent the decision criteria by which the appropriate content file is selected. The benefit of abstracting the content from the server application is that particular content file, such as the fr-FR file, can be edited without requiring a change in the source code or script.

The foregoing approaches for customization can be adequate in situations where the decision criteria are relatively simple or in which content is selected based on only one or two client attributes. If a new content file representing a different language and country were to be added in a system using conventional customization techniques, the source code or scripts executed by the server application must be altered to provide access to the new content. In situations where scalability or frequent changes in decision criteria are important or in which content is to be selected based on multiple criteria, conventional customization systems become unmanageable. For instance, multiple portions of the source code or script may need to be individually edited for customization to be adequately performed, which can lead to significant administrator resources being required or the risk of bugs being introduced into the code. In the coming years it is expected that customization of information based on larger number of client attributes and decision criteria will be required in many situations, making the need for extensible customization methods and systems even more important.

SUMMARY OF THE INVENTION

The present invention relates to server-side scripting executed by a server application to create customized documents for clients. The process of selecting the customized content is abstracted from the script and the server application and is implemented by a decision engine that is accessed by the server application. In this manner, new content can be easily added and the decision criteria can be conveniently modified without the need for changing the source code of the server application or the scripts executed by the server application.

There are two basic phases in the process of creating a customized document, namely, assembling the script that is designed to create the document and then executing the script. Assembling the script begins as a client issues a request to the server for the document. The server application receives the request and begins assembling a script that is associated with the requested document. The server application issues a request to the decision engine to resolve which content files contain content that is appropriate for the client.

The server application then encounters a Call statement in the script that causes the server application to issue a request for a particular template in one of the content files that includes customized content or additional instructions for selecting the customized content. The template includes a portion of script that is effectively concatenated with the original script, resulting in the script being supplemented and assembled at runtime. Additional requests for other templates can be performed based on the instructions included in the original script or the templates that have been added to the original script during runtime. Once all the required content files have been resolved and the script has been assembled, the script is executed to create the document for the client.

The foregoing process of customizing documents using server-side scripts has the benefit of removing the complexity of the decision process from the server application and the scripts to the decision engine and the content files. In particular, the scripts and the server application do not include the decision criteria used to identify the appropriate content, nor do they indicate to the decision engine how the selection is to be made. Instead, the server application merely requests the decision engine to identify appropriate content on whatever decision criteria are available to the decision engine. Accordingly, script developers or site administrators do not need to concern themselves with the decision process when writing scripts, which allows the script writing process to be streamlined and greatly reduces the logical complexity of the scripts and the possibility that bugs or logical inconsistencies will be introduced. Changes to the decision criteria can be made at the decision engine without altering the structure of the scripts.

Moreover, the scripts and the server application do not need to identify the value of attributes of the client (e.g., user language, country, age, level of subscription, etc.) on which the decisions will be made. Instead, the decision engine accesses attribute providers that exist separately from the server application to identify the values of such attributes. This feature of the invention further simplifies the process of writing and maintaining scripts for assembling customized documents.

Removing the decision process from the scripts in this manner also enables additional content to be introduced (e.g., support for a new language or country) without requiring a change to the scripts. For example, if content in a new language is added to the content files associated with the decision engine, the decision criteria of the decision engine can be adjusted to select the new language content if the user attributes have a particular value without changing the script.

In view of the foregoing, the server-side scripting of the invention enables customized documents to be efficiently created at runtime for particular clients. Customization systems using the invention can be scaled to any number of user criteria and different versions of content with only a minimal increase, if any, in the complexity of the server applications and associated scripts.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent-from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention relates to server-side scripting systems in which the decision criteria as well as the content used to create customized documents are abstracted from the server application and encapsulated within a decision engine that is accessed by the server application. The server-side scripting of the invention enables server-side scripts of potentially high complexity to be executed and supplemented at runtime to create documents that are customized to the particular requirements of clients. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
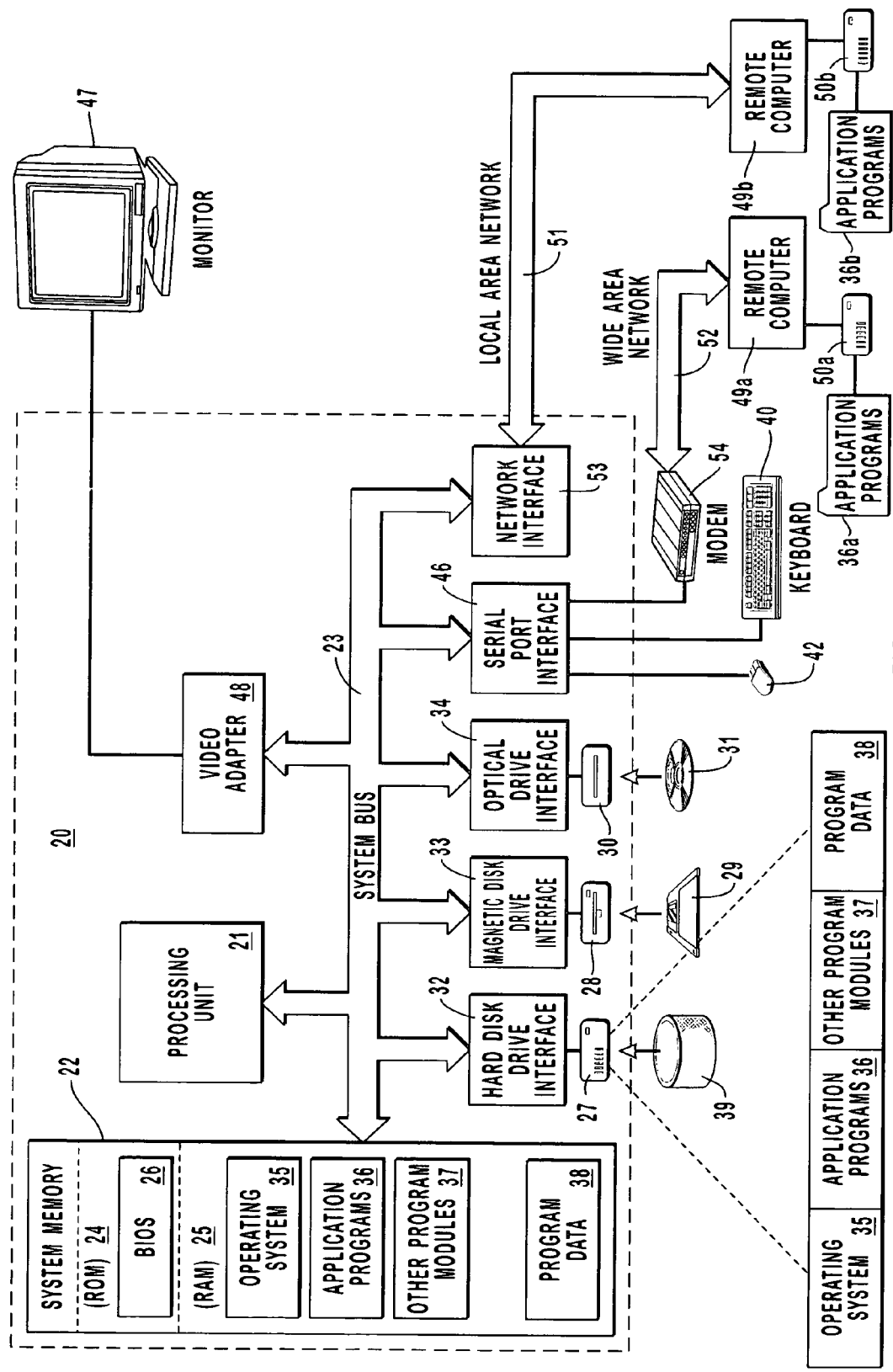
FIG. 1 illustrates an exemplary system that provides a suitable operating environment for the present invention.

FIG. 1 and the following discussion are intended to provide a brief, general description of a suitable computing environment in which the invention may be implemented.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
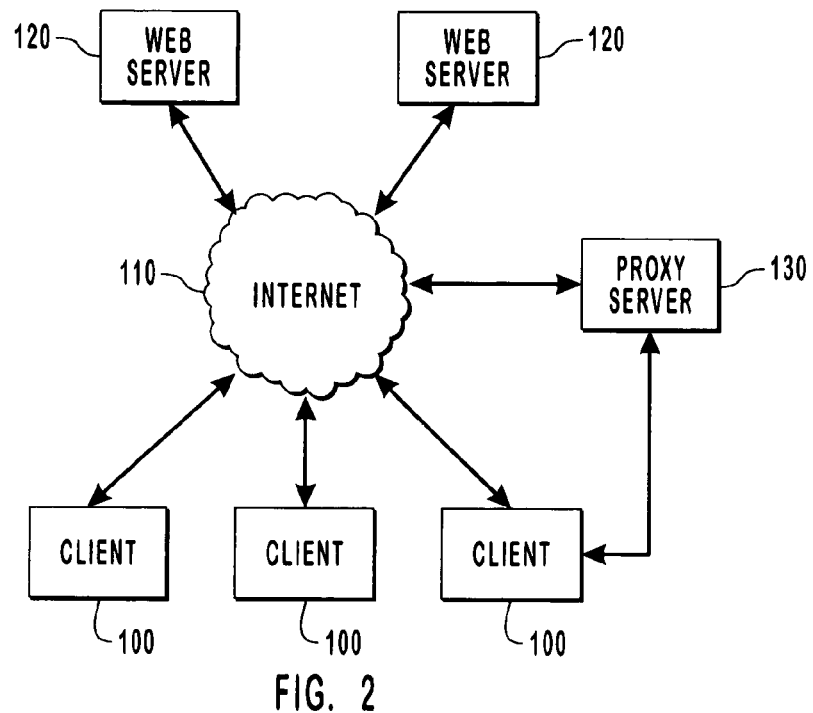
FIG. 2 is a block diagram illustrating an exemplary network in which the invention can be implemented.

FIG. 2 illustrates an exemplary environment in which the invention can be practiced. In FIG. 2, clients 100 access resources on the network by means of Internet 110. It should be noted that Internet 110 is merely one example of the local or wide area networks in which the server-side scripting of the invention can be practiced. Clients 100 can be any general purpose or special purpose computer such as those described above in referenced to FIG. 1. For instance, clients 100 can be set-top boxes or Internet terminals that use a television set as a display device for displaying Web pages. Alternatively, clients 100 can be personal computers that access the Internet.

Web servers 120 represent server computers associated with particular Web sites. Examples of Web servers 120 include those that provide access to search engines, Internet portals, information services such as news and financial data, or any other Internet site in which customized documents are to be provided to clients 100 using the server-side scripting methods of the invention. Proxy server 130 represents a computer that provides access to subscription-based information services, an example of which is the WebTV service of WebTV Networks, Inc. of Mountain View, Calif. Either one of proxy server 130 and Web servers 120 can implement the invention in any particular embodiment. The network environment of FIG. 2 is presented for purposes of illustration, and the invention can be practiced with other networks and servers. For example, intranet servers, local area network servers, and the like, can be used to implement the server-side scripting techniques disclosed herein.

Figure 3:
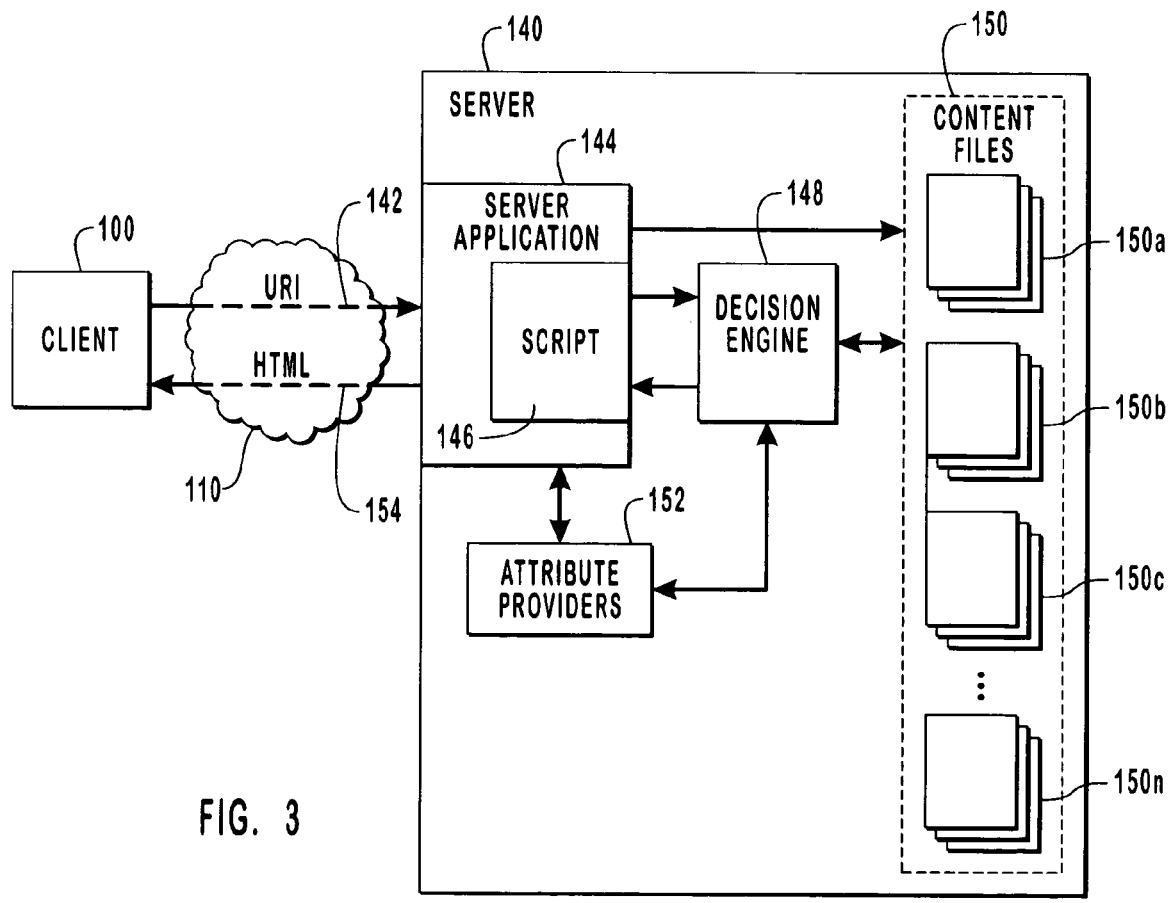
FIG. 3 depicts selected components of a server, including a server application, a decision engine, content files, and attribute providers, for customizing a document for a client.

FIG. 3 illustrates the interaction between the client and a server as a document is customized for the client according to one embodiment of the invention. The customization process begins as client 100 transmits a uniform resource identifier (URI) that represents that request for the document to Internet 110 and server 140 as shown in FIG. 3 at arrow 142. Server application 144 operating at server 140 recognizes the request for the document and begins assembling a script 146 that is associated with the particular document requested by client 100. In environments in which server 140 can generate a plurality of different web pages, server application 144 has access to a plurality of scripts 146, each being adapted to generate a particular document.

Prior to proceeding to specific examples of scripts and scripting syntax that can be used to implement the invention, general principles associated with using server-side scripting to customize documents will be further described in reference to FIG. 3. As server application 144 begins assembling script 146, it encounters code indicating that certain content files 150 are to be resolved in order to allow customized data to be incorporated into the document. During the process of assembling the script, server application 144 requests decision engine 148 to perform decisions and select appropriate content.

In one embodiment, decision engine 148 is one that has been disclosed in U.S. Pat. No. 6,704,776 entitled "Selecting Attribute Based Content for Server Applications," which was filed on the same day as the present application and is incorporated herein by reference. As described in the foregoing patent, decision engine 148 selects appropriate content from content files 150 without receiving information specifying the decision criteria from server application 144. In other words, the decision criteria are abstracted from server application 144 and script 146 and are encapsulated in decision engine 148. In order to request a decision identifying the appropriate content, server application 144 merely requests decision engine 148 to identify the appropriate content without informing the decision engine of any decision criteria that are to be used to make the decision.

Abstracting the decision criteria from server application 144 and script 146 into decision engine 148 enables the decision criteria to be modified as desired without requiring the code of the server application or script to be modified. Moreover, developers or site administrators who write scripts 146 do not need to be concerned about how decision engine 148 will identify the appropriate content for particular clients, but instead merely write the scripts to request the decision engine to make this determination.

As shown on FIG. 3, decision engine 148 can identify values of attributes or properties associated with clients 100 by referring to attribute providers 152, which are any software module, database, or other source of information specifying the values of such attributes or properties. In this manner the developers or site administrators writing scripts 146 do not need to be concerned with identifying the values of the attributes associated with client 100 or with providing these values to decision engine 148. Further details regarding decision engine 148, content files 150, and attribute providers 1525 according to one embodiment of the invention are disclosed in U.S. Pat. No. 6,704,776 entitled "Selecting Attribute Based Content for Server Applications," which has been incorporated herein by reference.

In reference to FIG. 3, it is noted that all three primary factors identified above for performing a decision to select appropriate content for a particular client can be abstracted from server application 144 and script 146. First, the values of the attributes or properties associated with client 100 can be obtained by attribute providers 152; second, the various versions of the content available for assembling the document can be obtained from content files 150; and third, the decision criteria for selecting the appropriate content are located at decision engine 148.

As decision engine 148 identifies appropriate content and informs server application 144 of the content, this appropriate content is retrieved from content files 150 and is used by server application 144 to continue the process of creating the customized document. In one embodiment, the customized content from content files 150 is in the form of further portions of script that are concatenated with the portions of script already present in script 146 to assemble the script at runtime, as will be described in greater detail below. As further portions of the script are retrieved from content files 150, script 146 can become as complex as is necessary to customize the document for client 100 as desired. Indeed, as additional portions of script are obtained from content files 150 and concatenated with script 146, these additional portions of script can in turn result in decision engine 148 being asked to select more content that is appropriate for client 100. Once the Hypertext Markup Language (HTML) or other document has been customized and created, the document is transmitted to client 100 as indicated at arrow 154.

Figure 4:
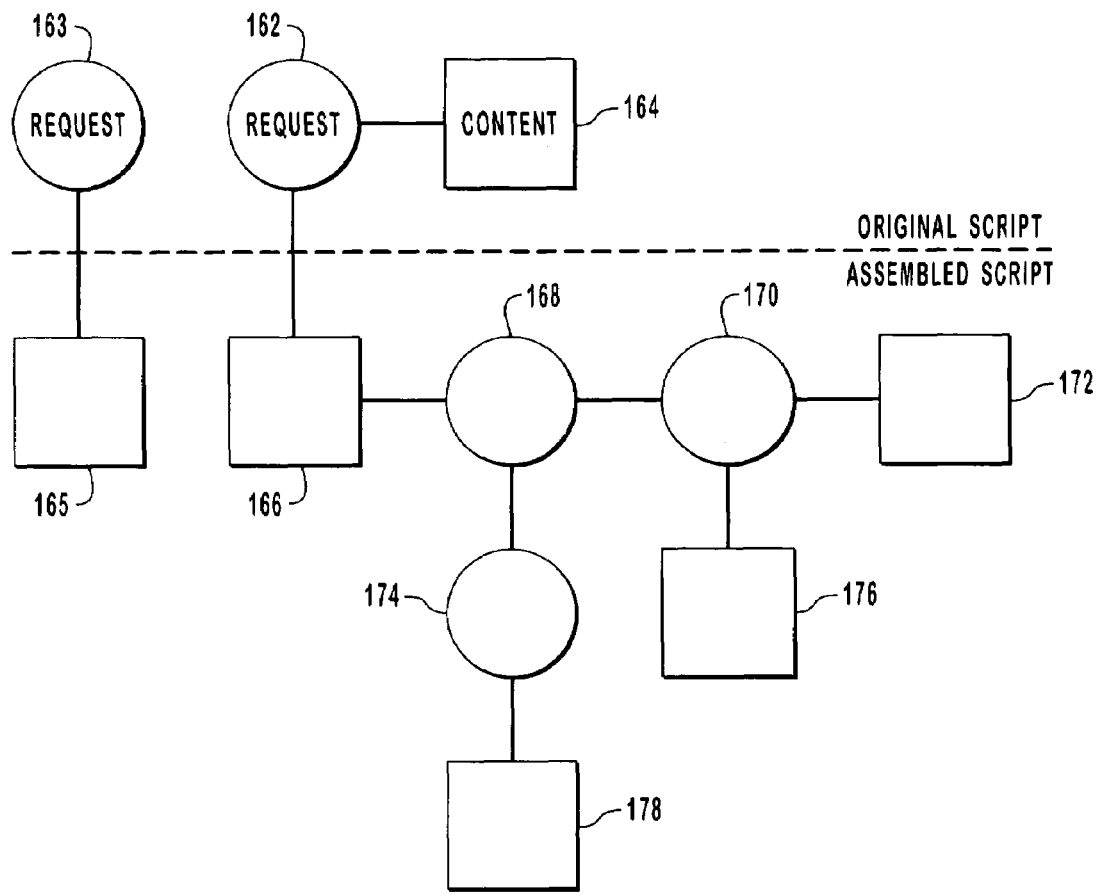
FIG. 4 graphically illustrates one example of a script that is assembled at runtime by adding request functionality and content to an original script in response to decisions made by the decision engine.

FIG. 4 graphically illustrates one example of how script 146 of FIG. 3 can be assembled at runtime in preparation for creating a customized document with any level of complexity. The script represented by FIG. 4 is assembled as the server application issues requests for the decision engine to resolve content files, the contents of which are concatenated into the original script. The elements of FIG. 4 represented by circles correspond to operations included in the script that request a decision from the decision engine regarding the appropriate content to be included in the customized document. The elements in FIG. 4 represented by squares correspond to content to be used to be used to create the document. The hierarchical nature of FIG. 4 represents the manner in which a request to the decision engine for a decision can result in further decisions and, eventually, specific content.

The portion of FIG. 4 above dotted line 160 represents the portion of script originally contained in the script processed by the server application. For instance, request 162 and 163 and content 164 are originally encoded in script 146 of FIG. 3. In this example, the server application, when identifying which content files are to be resolved, encounters requests 162 and 163, which are requests to the decision engine to identify, or resolve, an appropriate version of specified content for the document being created. The types of content that can be requested by a server application according to the invention can be any aspect of a document that can be customized for a particular user. For example, the content can be text, images, executable code embedded in a document, formatting of a displayable size of the document, formatting of displayed portions of the document, other formatting, and the like.

In this example, request 162 results in the decision engine identifying content 166, additional request 168, additional request 170, and content 172. Request 163 results in the identification of content 165. As elements 165–172 are identified by the decision engine, these requests and content are effectively concatenated with the original script to assemble the script at runtime according to the attributes of the client, the particular content included in the content files, and the decision criteria at decision engine 148. Again, it is noted that the server application 144 issues requests for the decision engine 148 to resolve content files, thereby causing the original script to be supplemented at runtime in a manner enables a customized document to be created for a particular client without the script or the server application having the burden of making the decisions or even including information that is used to make the decisions.

In this example, after request 162 results in the identification of an additional request 168, the creation of the customized document further includes server application 144 issuing request 168 to the decision engine. As a result, additional request 174 is identified to the server application and is concatenated with the previously assembled script. In turn, request 174 is made by server application 144 to decision engine 148 and content 176 is returned to server application 144 and concatenated with the previously assembled script. In a similar manner, request 170 results in content 178 being identified by decision engine 148 and concatenated with the previous assembled script. The foregoing process assembles a script at runtime that includes content represented by elements 164, 165, 166, 172, 176, and 178.

Once this content has been identified, server application 144 executes the assembled script to create a document, such as an HTML document. Depending on the nature of requests 162 and 163 included in the original script and supplemental requests 168, 170 and 174, the decision engine selects appropriate content elements that can include images, text, formatting, or any other feature of the document that is to be tailored to a particular client.

In order to further illustrate the method for assembling the script at runtime and using the script to generate a customized document as shown in the example of FIG. 4, the following portions of pseudocode are presented. It is to be understood that the particular syntax used to implement the invention is not critical, and the following examples are presented for purposes of illustration only.

In this example, it is assumed that a server 140 of FIG. 3 receives a request from a client 100 for a home page document of a Web site that is to be customized to include information tailored to the attributes of client 100 and a user of the client. The original script 146 (also represented by elements 162, 163, and 164 of FIG. 4) selected by server application 144 is one which corresponds to a basic template for constructing the requested document. The original script could be:

---
MAIN.JNX (Original Script)

<% resolve Strings %>
<% resolve Screen %>
    <% template Main %>
        <% call Banner %>
        <% call HelloText %>
        Enjoy Your Visit
    <% end-template %>
---

At this point, the server application 144 begins a process of resolving which content files are selected to be appropriate to create the document. The "resolve Strings" statement in the original script represents a request to the decision engine 148 of FIG. 3 to resolve, or identify, a particular "strings" file from content files 150 that is determined to be appropriate for client 100. For instance, content files 150a are designated for purposes of this example as "strings" files that contain content specifically tailored to certain clients or certain users. Based on decision criteria available to decision engine 148, the decision engine accesses an attribute provider to receive information specifying one or more attributes of client 100. Based on the specified one or more attributes and the decision criteria, the appropriate "string" file is selected from content files 150a. As noted previously, the decision criteria can be any desired criteria that can be selected and configured by an administrator of server 140 and can be edited and altered without changing the script 144. Moreover, the decision criteria are isolated from the script 144, such that the script writer does not need to be concerned with the decision process that will be applied to the script.

If the decision criteria indicate that the string files 150a are to be resolved using the language and country of the user of client 100, the decision engine 148 accesses an appropriate attribute provider 152 and identifies the language and country of the user, which may be stored in a database containing user profile information. For instance, the decision engine may learn that the user is associated with language and country attributes designated by "en-US" (English in the United States), in which case, the decision engine identifies the string file 150a that is for use with "en-US." Isolating the decision criteria from script 144 in this manner enables the administrator of server 140 to add support for other languages and countries by adding new content files 150a (e.g., ja-JA: Japanese in Japan) and editing the decision criteria as necessary without changing script 144.

The next line in the original script above is another Resolve statement, namely, "resolve Screen". This statement represents a request to the decision engine 148 to identify a screen file 150b that is selected to be appropriate for client 100. In this example, the screen files 150b include configuration or formatting content (i.e., formatting information) for various types of display devices that may be used by clients, such as those that use the Phase Alternating Line (PAL), National TV Standards Committee (NTSC), or other display device standards. Again, decision engine 148 selects the appropriate screen file 150b based on whatever decision criteria have been selected by, for example, an administrator of server 140. For instance, decision engine 148 may learn that client 100 has an NTSC display device, in which case, the decision engine selects the screen file 150b that has configuration or formatting content specifically tailored for NTSC display devices.

Server application 144 of FIG. 4 continues to process the original script and encounters a "Template" statement, which indicates that the nested code represents instructions for generating a document or a portion thereof. In this example, the original nested contents of the "template Main" statement include a "Call" statement and specific content to be included in the generated document. The statement "call Banner" represents an example of request 163 of FIG. 4, "call HelloText" represents an example of request 162, and "Enjoy Your Visit" represents an example of content 164. Attention will now be directed to the processing initiated by the statements "call Banner" and "call HelloText". Because the initial stage of the process of creating the customized document relates to resolving files and concatenating portions of script, specific content, such as "Enjoy Your Visit" is not processed at this stage, but is instead used after the script has been assembled to create the document.

As the server application 144 processes the "call Banner" statement, a request is made to decision engine 148 to identify the "Banner" content that is appropriate for client 100. In response, decision engine 148 selects the suitable "Banner" content, which is found in the "screen" content file 150b that has previously been selected as being appropriate for client 100. In this example, decision engine returns to server application a supplemental portion of script that has been found to correspond to "Banner" in the specified "screen" content file 150b:

---
SCREEN.JNX (Supplemental Script A)
---
<% template Banner %>
　　Banner [Image]
<% end-template %>
---

The template "Banner" includes an image represented by Banner [Image], which corresponds to content element 165 of FIG. 4. Supplemental script A is concatenated with the original script to generate concatenated script A:

---
Concatenated Script A
---
<% template Main %>
　　<% template Banner %>
　　　　Banner [Image]
　　<% end-template %>
　　<% call HelloText %>
　　Enjoy Your Visit
<% end-template %>
---

Server application 144 then processes the "call HelloText" statement, requesting decision engine 148 to identify the "HelloText" content that is appropriate for client 100. In response, decision engine 148 selects the suitable "HelloText" content, which is found in the "strings" content file 150a that has previously been selected as being appropriate for client 100. In this example, decision engine returns to server application a supplemental portion of script that has been found to correspond to "HelloText" in the specified "strings" content file 150a:

---
STRINGS.JNX (Supplemental Script B)
---
<% resolve Images %>
　　<% template HelloText %>
　　　　Hello Subscriber of
　　　　<% call TYServiceImage %>
　　　　<% call AffinityImage %>
　　　　Welcomes You
　　<% end-template %>
---

The foregoing supplemental script B includes a Resolve statement that results in decision engine 148 further resolving a content file (e.g., an image content file 150c) that is designated as appropriate for client 100. In this example, the appropriate image content file 150c is selected based on a client attribute indicating an enhanced television service to which the client is subscribed and an affinity group with which a user of the client identifies himself. For instance, a client profile associated that is associated with client 100 and which is accessible to an attribute provider 152 can specify which organization (e.g., non-profit organizations, sports teams, etc.) the user of the client has been identified with. In this example, the client has been identified with the charitable organization, "The Human Fund," and the decision engine resolves an associated image content file 150c.

It is noted that the "template HelloText" includes the content "Hello Subscriber of", the Call statements "call TVServiceImage" and "call AffinityImage" and the content "Welcomes You", which correspond to the content and request elements 166, 168, 170, and 172 of FIG. 4.

The supplemental script B is effectively concatenated with the original script to yield:

---
Concatenated Script B
---
<% template Main %>
　　<% template Banner %>
　　　　Banner [Image]
　　<% end-template %>
　　<% template HelloText %>
　　　　Hello Subscriber of
　　　　<% call TVServiceImage %>
　　　　<% call AffinityImage %>
　　　　Welcomes You
　　<% end-template %>
　　Enjoy Your Visit
<% end-template %>
---

Server application 144 then proceeds to the Call statement "call TVServiceImage" and thereby requests from the decision engine 148 the appropriate content designated by "TVServiceImage." Decision engine 148 then selects the appropriate "TV Service Image" content from images content file 150c, which has been previously resolved as being suitable for client 100.

The image content file 150c includes the following:

---
IMAGES.JNX
---
<% resolve Subscription %>
　　<% template TVServiceImage %>
　　　　<% call SubscriptionImage %>
　　<% end-template %>
<% template AffinityImage %>
　　Human Fund [Image]
<% end-template %>
---

In this example, decision engine 148 returns to server application 144 a supplemental portion of script that has been found to correspond to "TVServiceImage" in the specified image content file 150c, which is a portion of the file Images.jnx:

---
Supplemental Script C
---
<% resolve subscription %>
　　<% template TVServiceImage %>
　　　　<% call SubscriptionImage %>
　　<% end-template %>
---

The foregoing supplemental script B includes a "resolve" statement that results in decision engine 148 further resolving a "subscription" content file among a plurality of available subscription content files that is designated as appropriate for client 100. In this example, the appropriate "subscription" content file 150n is selected based on a client attribute indicating an enhanced television service to which the client is subscribed. In this example, a client profile associated that is associated with client 100 and which is accessible to an attribute provider 152 specifies that the client is subscribed to "FooTV", and the decision engine resolves an associated subscription content file. It is noted that the "template TVServerImage" includes the Call statement, "call SubscriptionImage", which corresponds to the request element 174 of FIG. 4.

The supplemental script C is effectively concatenated with the concatenated script B to yield:

---
Concatenated Script C
---
```
<% template Main %>
    <% template Banner %>
        Banner [Image]
    <% end-template %>
    <% template Hello Text %>
        Hello Subscriber of
        <% template TYServiceImage %>
            <% call SubscriptionImage %>
        <% end-template %>
        <% call AffinityImage %>
        Welcomes You
    <% end-template %>
    Enjoy Your Visit
<% end-template %>
```
---

At this point, it is evident that script 144 of FIG. 3 can be assembled at runtime and can have any desired degree of complexity to customize a document to the particular attributes of the client based not on the contents of the original script or on the source code of server application 142, but instead based on the decision criteria associated with decision engine 148 and the contents of content files 150. Moreover, the assembled script can include any number of nested template blocks, each of which may have been selected based on any of a number of extensible attributes associated with the client.

Returning to the present example, server application 142 continues recursively resolving files and concatenating the contents of the resolved file into the script. The next portion of the script to be processed is the portion of concatenated script C represented by supplemental script C, which contains the Call statement, "call SubscriptionImage". This Call statement results in decision engine 148 being requested to identify from the appropriate subscription content file 150n the "SubscriptionImage" that is appropriate for client 100. In this example, decision engine 148 selects the following portion of script:

---
SUBSCRIPTION.JNX (Supplemental Script D)
---
```
<% template SubscriberImage %>
    FooTV [Image]
<% end-template %>
```
---

It is noted that the "template TVServerImage" includes an image represented by FooTV [Image], which corresponds to the content element 178 of FIG. 4. The supplemental script D is effectively concatenated with the concatenated script C to yield:

---
Concatenated Script D
---
```
<% template Main %>
    <% template Banner %>
        Banner [Image]
    <% end-template %>
```

---continued
---
Concatenated Script D
---
```
    <% template HelloText %>
        Hello Subscriber of
        <% template TVServiceImage %>
            <% template SubscriberImage %>
                FooTV [Image]
            <% end-template %>
        <% end-template %>
        <% call AffinityImage %>
        Welcomes You
    <% end-template %>
    Enjoy Your Visit
<% end-template %>
```
---

At this point, server application 144 has traversed the script to a portion of script (e.g., the content that corresponds to element 178 in the hierarchical model of FIG. 4) that has no child node. In this case, server application advances to the next portion of script that has not yet been processed, namely, the Call statement "call AffinityImage". This Call statement corresponds to the request element 170 of FIG. 4, and results in a request to decision engine 148 for the appropriate content designated by "AffinityImage". Decision engine 148 then selects the suitable "AffinityImage" content from image content file 150c, which has been previously resolved. In this example, decision engine 148 returns to server application 144 a supplemental portion of script that has been found to correspond to "AffinityImage" in the specified image content file 150c:

---
Supplemental Script E (from Images.jnx)
---
```
<% template AffinityImage %>
    Human Fund [Image]
<% end-template %>
```
---

The "template AffinityImage" includes an image represented by Human Fund [Image], which corresponds to the content element 176 of FIG. 4. The supplemental script E is effectively concatenated with the concatenated script D to yield:

---
Concatenated Script E
---
```
<% template Main %>
    <% template Banner %>
        Banner [Image]
    <% end-template %>
    <% template HelloText %>
        Hello Subscriber of
        <% template TVServiceImage %>
            <% template SubscriberImage %>
                FooTV [Image]
            <% end-template %>
        <% end-template %>
        <% template AffinityImage %>
            Human Fund [Image]
        <% end-template %>
        Welcomes You
    <% end-template %>
    Enjoy Your Visit
<% end-template %>
```
---

At this stage of the process, there are no more Call statements in the concatenated script, meaning that server application 144 has made all requests necessary for assembling the script and preparing to use the script to create the customized document for the client. Although not presented in the foregoing example, any of the templates can include formatting information that is selected to be applicable to the client based on the client attributes associated with the type of display device of the client.

Figure 5:
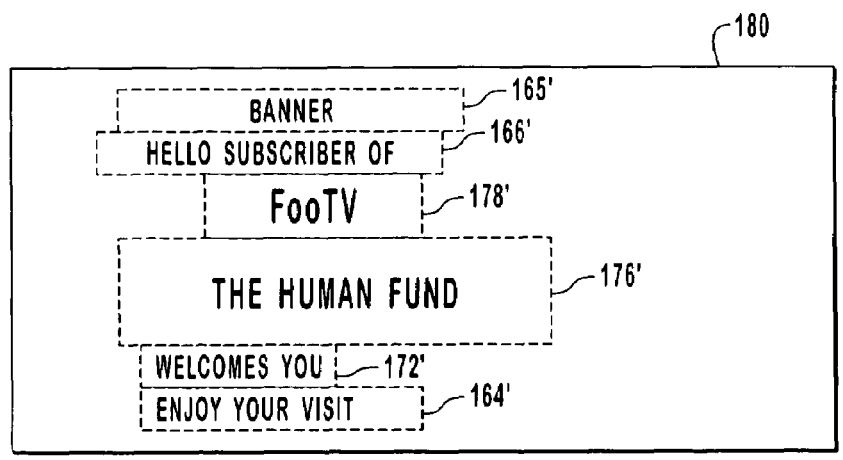
FIG. 5 represents a customized document that has been created according to a specific example disclosed herein.

The server application can then execute concatenated script E to create the customized document. The document can be created by generating an HTML or another document having the content, including formatting, that is specified in the concatenated script E. For instance, the HTML document 180 generated by the server application using the script may appear generally as illustrated in FIG. 5. Document 180 has six regions 164', 165', 166', 172', 176', and 178' that represent content and which correspond to elements 164, 165, 166, 172, 176, and 178 of FIG. 4. Document 180 has been customized at several levels for the client. For instance, regions 166' and 172' have been customized based on the language and country of the user. Region 165' has been customized for the type of display device associated with the user. Region 176' has been customized based on an affinity group with which the user has been identified. Region 178' has been customized based on a TV service to which the user subscribes.

Figure 6:
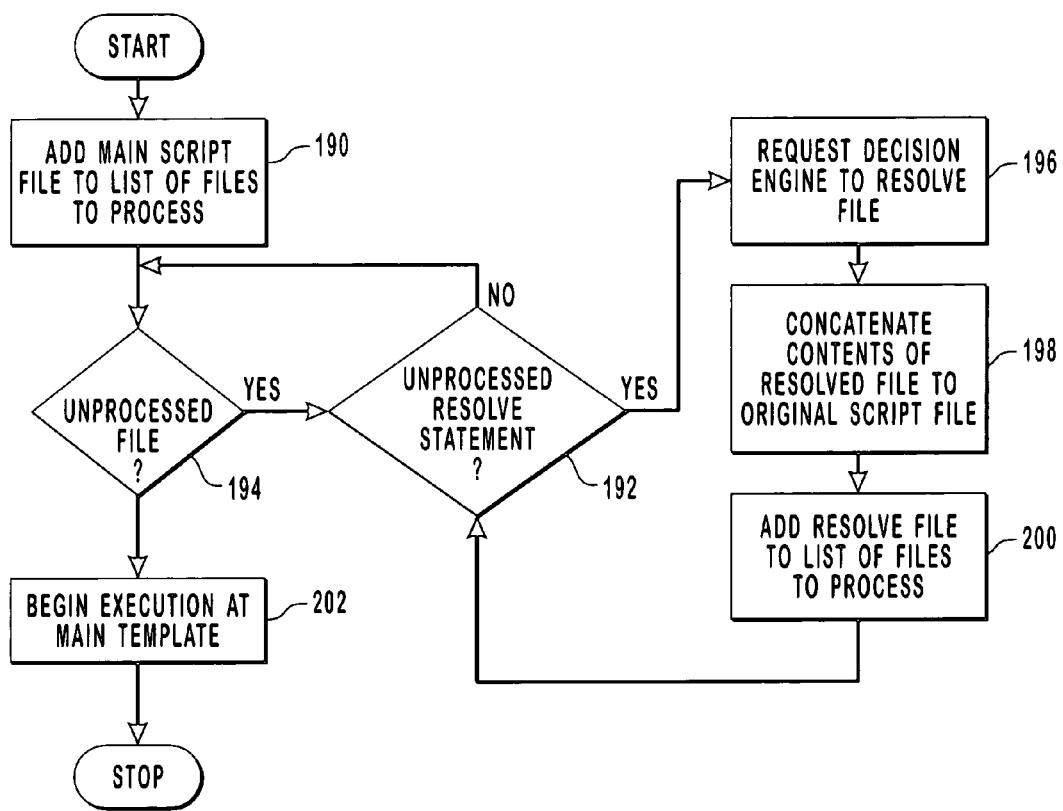
FIG. 6 is a flow diagram illustrating a method for assembling a server-side script to create a customized document according to one embodiment of the invention.

FIG. 6 is a flow diagram further describing the manner in which a script is assembled by a server application resulting in the decision engine identifying supplemental portions of script and content to be used to create a customized document. In act 190, original script 146 of FIG. 3 (i.e., the main script) is added to a list of files to be processed (i.e., resolved and examined for relevant content). In decision block 192, it is determined whether there remains any unprocessed files in the list. Initially, the main script represents an unprocessed file, and the method advances to decision block 194. In decision block 194, it is determined whether the unprocessed file includes an unprocessed "Resolve" statement. Assuming that there is an unprocessed resolve statement, the server application encounters the "Resolve" statement in the script and the method advances to act 196.

In act 196, and in response to the Resolve statement, the server application issues a request to the decision engine to resolve, or identify, content files 150 of FIG. 3 that are appropriate for client 100 based on whatever criteria are designated at decision engine 148.

In act 198, the contents of the resolved file are concatenated with the original script, such that the original script is assembled at runtime. In act 200, the resolved file is added to the list of files that remain to be processed. In this manner, any additional "Resolve" statements or other statements that require the decision engine to perform decisions can be processed during the assembly of the script. So long as there remain unprocessed files and unprocessed resolve statements, the method returns to acts 196, 198, and 200 until the content files have been resolved and the portions of script contained in the content files are concatenated with the original script. Based on the contents of the original script, the content files, and the decision criteria employed by the decision engine, decision blocks 192 and 194 and acts 196, 198, and 200 result in the creation, at runtime, of a script that is adapted specifically to generate a document that is customized for the particular client and user to which it will be transmitted. At act 202, the assembled script is executed so as to generate the code, such as HTML code, that is to be transmitted to the client.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a server included in a network that also includes a client associated with specified attributes, a method of using a decision engine to create a document for use by the client, the document being customized according to the specified attributes associated with the client, the method comprising the acts of:

receiving a request for a document at a server application, the server application being configured to generate the document from a script, the request including at least a client identifier;

the server application generating and sending a corresponding request to a decision engine, which is separate from the server application, to select content for the document wherein the corresponding request includes at least an indication of the client identifier and specifies that the decision engine is to identify appropriate customized content for the client based on client configuration;

wherein the decision engine, upon receiving the corresponding request:

utilizes the at least an indication of the client identifier to access at least one other attribute of the client from an attribute provider, the at least one other attribute representing an aspect of the client's configuration, the attribute provider being separate from the decision engine and the server application, wherein attributes can be added at the attribute provider without having to modify computer-executable instructions of the decision engine or the server application;

applies available decision criteria to the accessed at least one other attribute to select customized content, from a plurality of available content, that the decision engine determines to be appropriate for the client; and sends identification of the selected customized content to the server application;

the server application receiving from the decision engine the identification of the customized content that has been selected by the decision engine, wherein the act of receiving the identification of the customized content comprises the act of receiving a first script that, when executed by the server application, results in the customized content being incorporated into the document, wherein the first script includes a reference to a second script, wherein the reference to the second script enables the server application to request additional information from the decision engine that operates as a second portion of the first script and that corresponds to customized content for the document, wherein any additional information received as part of the second portion is concatenated with the first script by the server application;

the server application creating the document and incorporating into the document the customized content that has been selected by the decision engine, as identified by said first script, the customized content being appropriate for presentation at the client based on the configuration of the client represented in the at least one other client attribute accessed from the attribute provider; and transmitting the document to the client.

2. A method as recited in claim 1, further comprising:
the act of the server application processing code associated with the first script to incorporate the customized content into the document.

3. A method as recited in claim 1, wherein requesting the decision engine to select customized content for the document is further conducted without the server application communicating any decision criteria to the decision engine.

4. A method as recited in claim 1, wherein the document is a Web page.

5. A method as recited in claim 4, wherein the customized content comprises at least one of text and an image.

6. A method as recited in claim 4, wherein the customized content comprises formatting content.

7. In a server included in a network that also includes a client associated with specified attributes, a method of creating a document for use by the client, the document being customized according to the specified attributes associated with the client, the method comprising the acts of:

receiving a request for a document at a server application, the server application being configured to generate the document from a script, the request including at least a client identifier;

assembling the script at the server application, the script including instructions for creating a document, wherein assembling the script includes:

upon processing a first portion of a script associated with the document and identifying a reference to a second portion of script within the first portion of script, issuing to a decision engine, that is separate from the server application, another request for the decision engine to select the second portion of the script, wherein the request sent from the server application to the decision engine includes at least an indication of the client identifier and specifies that the decision engine is to identify the second portion of the script based on client configuration;

wherein the decision engine, upon receiving the other request:

utilizes the at least an indication of the client identifier to identify at least one other client attribute of the client from an attribute provider, the at least one other attribute representing an aspect of the client's configuration, the attribute provider being separate from the decision engine and the server application such that attributes can be added at the attribute provider without having to modify computer-executable instructions of the decision engine or the server application;

selects the second portion of the script based on the at least one other identified client attribute in accordance with decision criteria available to the decision engine; and sends the second portion of the script to the server application; and the server application receiving from the decision engine the requested second portion of the script;

the server application concatenating the first portion of the script and the second portion of the script by inserting the second portion of script into the first script portion of script to replace the reference to the second portion of script, prior to executing the first portion of script to incorporate customized content into the document; and executing the first portion of the script and the second portion of the script so as to incorporate customized content into the document, the customized content being appropriate for presentation at the client based on the configuration of the client represented in the at least one other client attribute accessed from the attribute provider.

8. A method as recited in claim 7, wherein the act of executing the first portion of the script and the second portion of the script so as to incorporate customized content into document further comprises the act of continuing to receive nested portions of script from the decision engine, including:

upon processing the second portion of the script, issuing to the decision engine a further request for the decision engine to select a third portion of the script based on the at least one other identified client attributes without the script identifying said at least one other identified client attribute; and receiving from the decision engine the requested third portion of the script and concatenating the third portion of the script and the second portion of the script and the first portion of the script.

9. A method as recited in claim 7, wherein the act of receiving a request including at least a client identifier comprises an act of receiving a request from the client for the document.

10. A method as recited in claim 9, further comprising the act of transmitting the created document to the client.

11. A method as recited in claim 7, further comprising the act of the decision engine selecting the second portion of the script, including:

identifying, independently of a server application that executes the script, the available decision criteria that are to be used by the decision engine to select the second portion; and identifying, independently of the server application, the at least one other client attribute that is to be used by the decision engine to select the second portion.

12. A method as recited in claim 11, wherein the act of the decision engine selecting the second portion of the script further includes applying the available decision criteria to the at least one other identified client attribute to select said second portion of script from among a plurality of portions of script.

13. A computer program product for implementing, in a server included in a network that also includes a client associated with specified attributes, a method of creating a document for use by the client, the document being customized according to the specified attributes associated with the client, the computer program product comprising:

a computer-readable medium carrying computer-executable instructions for performing the method, the method comprising the acts of:

receiving a request for a document at a server application, the server application being configured to generate the document from a script, the request including at least a client identifier;

assembling the script at the server application, the script including instructions for creating a document, wherein assembling the script includes:

upon processing a first portion of a script associated with the document, issuing to a decision engine, that is separate from the server application, another request for the decision engine to select a second portion of the script, wherein the request sent from the server application to the decision engine includes at least an indication of the client identifier and specifies that the decision engine is to identify the second portion of the script based on client configuration;

wherein the decision engine, upon receiving the other request:

utilizes the at least an indication of the client identifier to identify at least one other client attribute of the client from an attribute provider, the at least one other attribute representing an aspect of the client's configuration, the attribute provider being separate from the decision engine and the server application such that attributes can be added at the attribute provider without having to modify computer-executable instructions of the decision engine or the server application;

selects the second portion of the script based on the at least one other identified client attribute in accordance with decision criteria available to the decision engine;

sends the second portion of the script to the server application; and the server application receiving from the decision engine the requested second portion of the script;

the server application concatenating the first portion of the script and the second portion of the script by inserting the second portion of script into the first script portion of script to replace the reference to the second portion of script, prior to executing the first portion of script to incorporate customized content into the document; and executing the first portion of the script and the second portion of the script so as to create the incorporate customized content into the document, the customized content being appropriate for presentation at the client based on the configuration of the client represented in the at least one other client attribute accessed from the attribute provider.

14. A computer program product as recited in claim 13, wherein the act of assembling the script further comprises the act of continuing to receive nested portions of script from the decision engine, including:

upon processing code included in the second portion of the script, issuing to the decision engine a further request for the decision engine to select a third portion of the script based on the at least one other identified client attributes without the script identifying said at least one other identified client attribute; and receiving from the decision engine the requested third portion of the script and concatenating the third portion of the script and the second portion of the script and the first portion of the script.

15. A computer program product as recited in claim 13, wherein the act of receiving a request including at least a client identifier comprises an act of receiving a request from the client for the document.

16. A computer program product as recited in claim 15, wherein the method further comprises the act of transmitting the created document to the client.

17. A computer program product as recited in claim 13, wherein the method further comprises the act of the decision engine selecting the second portion of the script, including:

identifying, independently of a server application that executes the script, the available decision criteria that are to be used by the decision engine to select the second portion; and identifying, independently of the server application, the at least one attribute of the client that is to be used by the decision engine to select the second portion.

18. A computer program product as recited in claim 17, wherein the act of the decision engine selecting the second portion of the script further includes applying the available decision criteria to the at least one other identified client attribute to select said second portion of script from among a plurality of portions of script.

19. A method as recited in claim 1, wherein the decision engine includes decision criteria for identifying the content and wherein the server application is configured without the decision criteria that are used to identify the content.

20. A method as recited in claim 1, wherein changes can be made to the decision criteria without altering code of the server application.

21. A method as recited in claim 1, wherein receiving a request for a document at a server application comprises receiving a request that includes a URI.

22. A method as recited in claim 1, wherein utilizing the at least an indication of the client identifier to access at least one other attribute of the client from an attribute provider comprises utilizing the at least an indication of the client identifier to access at least one other attribute of the client, the at least one other attribute of the client selected from among a user language, a country, an age, a level of subscription, a type of display device, and a group affinity.

23. A method as recited in claim 1, wherein utilizing the at least an indication of the client identifier to access at least one other attribute of the client from an attribute provider comprises utilizing the at least an indication of the client identifier to access at least one other attribute of the client from a database of information specifying the values of client attributes.

* * * * *